(12) United States Patent
Shveidel et al.

(10) Patent No.: US 11,822,473 B2
(45) Date of Patent: Nov. 21, 2023

(54) SMOOTH FLUSHING OF CACHED WRITE DATA

(71) Applicant: EMC IP Holding Company LLC, Hopkinton, MA (US)

(72) Inventors: Vladimir Shveidel, Pardes-Hana (IL); Socheavy Heng, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 17/231,197

(22) Filed: Apr. 15, 2021

(65) Prior Publication Data

US 2022/0334965 A1    Oct. 20, 2022

(51) Int. Cl.
*G06F 12/0804* (2016.01)
*G06F 12/10* (2016.01)

(52) U.S. Cl.
CPC .......... *G06F 12/0804* (2013.01); *G06F 12/10* (2013.01); *G06F 2212/608* (2013.01)

(58) Field of Classification Search
CPC ...... G06F 12/10; G06F 12/08; G06F 12/0804; G06F 12/0882; G06F 16/322; G06F 16/9027; G06F 16/2246; G06F 12/1009
USPC ........... 711/12.059, 206, 147, 154, 170, 202, 711/208, E12.001, E12.002, 216, 711/E12.068, 143
See application file for complete search history.

(56) References Cited

U.S. PATENT DOCUMENTS

| | | | |
|---|---|---|---|
| 8,977,660 B1 | 3/2015 | Xin et al. | |
| 10,552,322 B2 | 2/2020 | Hu et al. | |
| 10,664,401 B2 | 5/2020 | Xu et al. | |
| 10,705,735 B2 | 7/2020 | He et al. | |
| 11,163,449 B2 | 11/2021 | Faibish et al. | |
| 2016/0378530 A1* | 12/2016 | Ramasubramanian | G06F 9/45558 718/1 |
| 2018/0011792 A1* | 1/2018 | Koker | G06F 12/1009 |
| 2018/0336229 A1* | 11/2018 | Muehle | G06F 16/245 |
| 2019/0188156 A1* | 6/2019 | Sampathkumar | G06F 12/128 |
| 2020/0379774 A1* | 12/2020 | Alperovich | G06F 12/0804 |

* cited by examiner

*Primary Examiner* — Yaima Rigol
*Assistant Examiner* — Edward Waddy, Jr.
(74) *Attorney, Agent, or Firm* — BainwoodHuang

(57) ABSTRACT

A method of performing write operations that have been received by a data storage apparatus is provided. The method includes (a) storing page descriptors for received write operations within temporary storage, each page descriptor indicating respective data to be written; (b) upon storing each page descriptor, organizing that page descriptor into a shared working-set structure; and (c) operating a plurality of flushers to persist the data indicated by respective page descriptors to long-term persistent storage based on organization of the page descriptors in the shared working-set structure, each flusher accessing page descriptors via the shared working-set structure. An apparatus, system, and computer program product for performing a similar method are also provided.

18 Claims, 8 Drawing Sheets

SMOOTH FLUSHING OF CACHED WRITE DATA

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems include a high-speed non-volatile cache into which all writes are persisted upon receipt in order to ensure that the writes are secured against power failure even when the system operates in a write-back mode. Write-back mode allows writes to be acknowledged prior to being completed. These systems acknowledge writes once they are stored in the high-speed non-volatile cache.

SUMMARY

Some storage systems utilize a set of ring buffers for arranging the high-speed non-volatile cache. Thus, there may be an organizational ring buffer that identifies transactions as well as locations in one or more data ring buffers where the data of those transactions are cached. Entries may be placed into these ring buffers in the order in which they are received. Although, in principle, these entries may be processed for flushing to long-term persistent storage in the order in which they are stored, there are various reasons why doing so may not be optimal. For example, it may be desirable to store related data (or data with logically-adjacent addresses) together in long-term persistent storage even if not received together. However, in order to be able to flush entries out-of-order, it is important to keep track of dependencies so that later operations are not performed prior to earlier operations on which they depend. This can happen, for example, in the case of copy operations, if a source block is copied to a destination block elsewhere, but then a later write to the source block is performed prior to the copy operation. Some systems avoid this problem by operating a flush manager to carefully analyze all pending entries for dependencies and then to assign related entries for flushing by a single flusher of a plurality of parallel flushers, taking the dependencies into consideration.

Unfortunately, such an approach may be inefficient because analyzing the dependencies after ingest can be quite complex, wasting processing resources and introducing latency. In addition, because the flush manager must assign flushing of entries in advance, it must estimate how much space the entries will take up on disk (e.g., by assuming a fixed data reduction ratio) even though it is difficult to do so accurately, given the use of compression and deduplication. For systems that store flushed data in fixed-length storage segments that are filled by respective flushers, many of the fixed-length storage segments will not be filled to capacity. In addition, because ring buffers cannot reclaim entries until their oldest entries are removed, flushing entries out of order may end up causing a ring buffer to fill up, preventing new writes from being ingested even while much space is unused within the rig buffers.

Therefore, it would be desirable to organize the high-speed non-volatile cache without using ring buffers in a manner that also improves dependency analysis and increases the utilization of fixed-length storage segments. This may be accomplished by organizing page descriptors of a pool of page descriptors into a shared working-set structure whose organization accounts for dependencies. This allows for many flushers to independently operate in parallel to flush from the working-set structure until each respective flusher's fixed-length storage segment is full. By arranging the shared working-set structure into easily-detachable containers, operation can be further optimized.

In one embodiment, a method of performing write operations that have been received by a data storage apparatus is provided. The method includes (a) storing page descriptors for received write operations within temporary storage, each page descriptor indicating respective data to be written; (b) upon storing each page descriptor, organizing that page descriptor into a shared working-set structure; and (c) operating a plurality of flushers to persist the data indicated by respective page descriptors to long-term persistent storage based on organization of the page descriptors in the shared working-set structure, each flusher accessing page descriptors via the shared working-set structure. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for organizing a cache without using ring buffers in a manner that also improves dependency analysis and increases the utilization of fixed-length storage segments. This may be accomplished by organizing page descriptors of a pool of page descriptors into a shared working-set structure whose organization accounts for dependencies. This allows for many flushers to independently operate in parallel to flush from the working-set structure until each respective flusher's fixed-length storage segment is full. By arranging the shared working-set structure into easily-detachable containers, operation can be further optimized.

Figure 1:
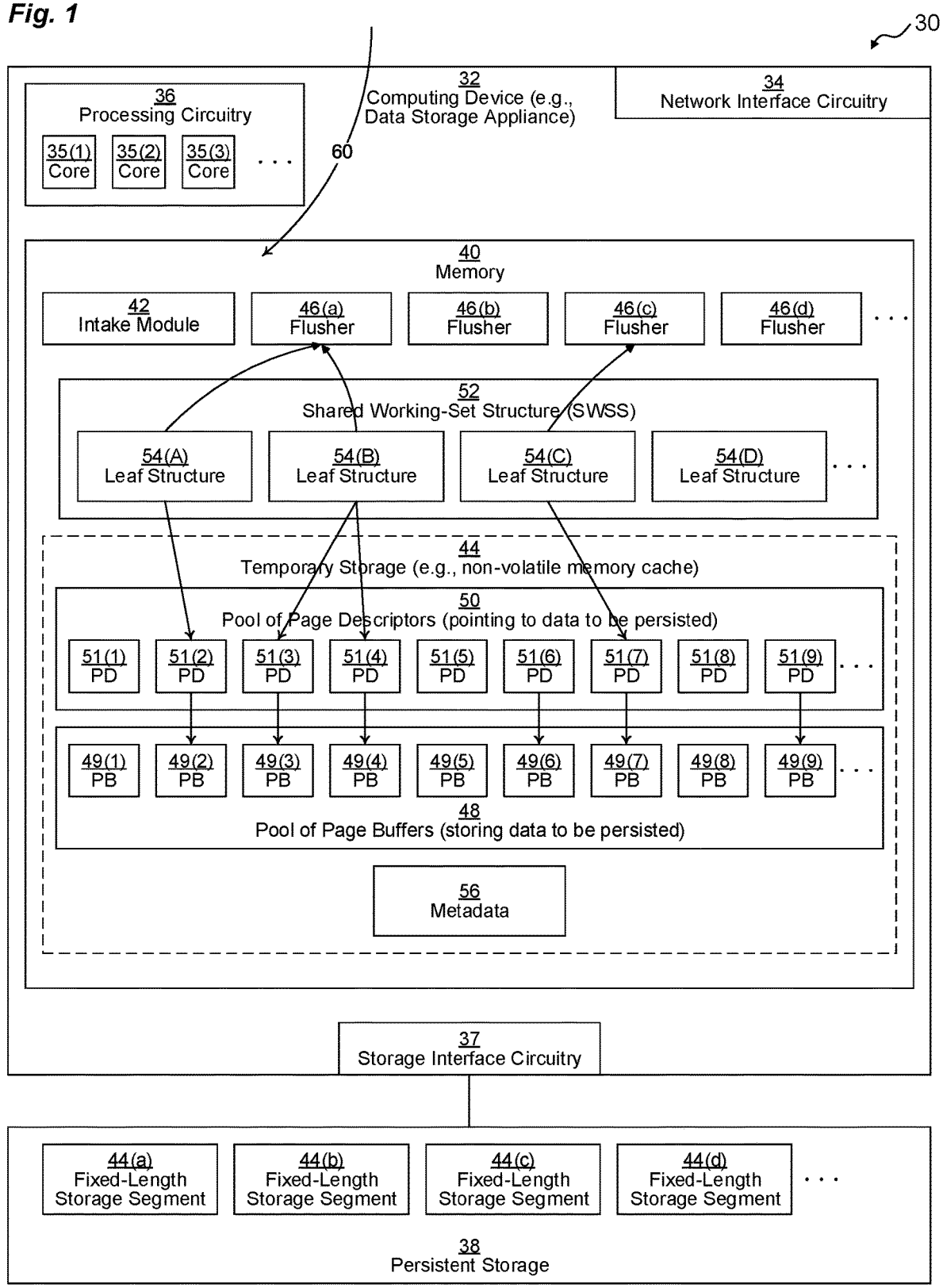
FIG. 1 is a block diagram depicting an example system, apparatus, and data structure arrangement for use in connection with various embodiments.

FIG. 1 depicts an example environment 30 for use in connection with various embodiments. Environment 30 includes a computing device 32. Computing device 32 may be any kind of computing device, such as, for example, a personal computer, workstation, server computer, enterprise server, data storage array device, laptop computer, tablet computer, smart phone, mobile computer, etc. In an example embodiment, computing device 32 may be a data storage appliance configured to provide access to persistent storage 38.

Computing device 32 may include network interface circuitry 34, processing circuitry 36, storage interface circuitry 37, and memory 40.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above. As depicted, processing circuitry 36 includes a plurality of cores 35 (depicted as cores 35(1), 35(2), 35(3), . . . ).

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage drives (not depicted), such as, for example, hard disk drives, solid-state storage devices (SSDs), flash drives, etc.

Network interface circuitry 34 may include one or more Ethernet cards, cellular modems, Fibre Channel (FC) adapters, InfiniBand adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc.

Memory 40 may include any kind of digital system memory, such as, for example, random access memory (RAM). Memory 40 stores an operating system (OS) (not depicted) and various drivers (e.g., storage drivers, not depicted) in operation (e.g., a Linux, UNIX, Windows, MacOS, or similar operating system). Memory 40 also stores an intake module 42, a plurality of flushers 46 (depicted as flushers 46(a), 46(b), 46(c), 46(d), . . . ), and other software modules (not depicted) which each execute on processing circuitry 36. Memory 40 also stores a shared working-set structure (SWSS) 52.

In some embodiments, memory 40 includes a temporary storage portion 44 of non-volatile memory, such as, for example, a high-speed cache. Non-volatile memory portion 44 may include, for example, Intel Optane memory, a high-speed SSD drive, etc. In some embodiments, non-volatile memory portion 44 may be shared or mirrored with another computing device 32.

Memory 40, typically within non-volatile memory portion 44, includes a pool 48 of page buffers 49 (depicted as PBs 49(1), 49(2), 49(3), 49(4), 49(5), 49(6), 49(7), 49(8), 49(9), . . . ), a pool 50 of page descriptors 51(depicted as PDs 51(1), 51(2), 51(3), 51(4), 51(5), 51(6), 51(7), 51(8), 51(9), . . . ), and metadata 56.

PDs 51 reference and describe respective PBs 49. In some embodiments, a PD 51 points to a respective PB 49, while in other embodiments, the PDs 51 are laid out within pool 50 in such a way that the location of each PD 51 within pool 50 implicitly associates it with a respective PB 49, the PBs 49 also being laid out within pool 48 in a similar manner.

Each PB 49 may be, for example, a memory page (e.g., 4 or 8 kilobytes), representing cached data to be written to long-term persistent storage 38 as parts of transactions. The PD 51 that is associated with a PB 49 describes the transaction, including, for example, information about a logical location where the data is meant to be placed (e.g., a volume and logical block address) and a transaction sequence number. Some PDs 51 may not refer to specific data in a PB 49 (e.g., if the PD 51 describes a delete or unmap operation or a zero-fill or write-same operation); in some such embodiments these bufferless PDs 51 may be stored separately from the buffered PDs 51 that are associated with respective PBs 49. An incoming write operation 60 that is directed to a range of addresses may be initially ingested as a set of PBs 49, one for each block covered by the range of addresses to be written, each of these PBs 49 having a respective PD 51 that identifies the particular logical address within the range of addresses for that block.

SWSS 52 is a structure that organizes the PDs 51. SWSS 52 includes various leaf structures 54, each of which references one or more related PDs 51. For more information about the makeup of a leaf structure 54, see below in connection with FIG. 4. SWSS 52 may also include various additional structure, not depicted in FIG. 1, which organizes the leaf structures 54. For more information about the organization of leaf structures within SWSS 52, see below in connection with FIGS. 3A-3C.

In operation, intake module 42 initially processes incoming write commands 60 (and other commands that make changes, such as delete and unmap commands), creating PBs 49 and respective PDs 51 and organizing those PDs 51 into leaf structures 54 within SWSS 52, as well as organizing the leaf structures 54 within the SWSS 52. In addition, several flushers 46 operate concurrently. Each flusher 46 is responsible for a particular fixed-length storage segment (FLSS) 44 (depicted as fixed-length storage segments 44(a), 44(b), 44(c), 44(d), . . . ) in persistent storage 38. Each flusher 46 operates independently, accessing particular PDs 51 by claiming leaf structures 54 from the SWSS 52 and persisting the data of the PBs 49 of those PDs 51 in its respective FLSS 52. Thus, for example, as depicted, PD 51(2) is referenced by leaf structure 54(A), PDs 52(3), 51(4) are referenced by leaf structure 54(B), and PD 51(7) is referenced by leaf structure 54(C). In addition, flusher 46(a) has claimed leaf structures 54(A), 54(B), so it persists the data of PBs 49(2), 49(3), 49(4) to the FLSS 44(a) assigned to flusher 46(a). While doing so, flusher 46(a) also updates metadata 56 in order to persist information about where the data of PBs 49(2), 49(3), 49(4) is stored in persistent storage 38. An FLSS 44 has a fixed size which may vary from embodiment to embodiment. In one example embodiment, an FLSS 44 has a size of 2 megabytes (MB). The size of an FLSS 44 may be selected based on a layout of the persistent storage 38. Thus, for example, if persistent storage 38 utilizes RAID-5 with a 4+1 configuration, then 1 MB or 2 MB would be convenient sizes (e.g., writing 256 KB or 512 KB per drive per stripe). As another example, if persistent storage 38 utilizes RAID-6 with a 6+2 configuration, then 1.5 MB or 3 MB would be convenient sizes (e.g., writing 256 KB or 512 KB per drive per stripe).

Memory 40 may also store various other data structures used by the OS, modules 42, 46, and various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the computing device 32 is powered off. The OS, modules 42, 46, and various other applications and drivers are typically stored in this persistent storage portion of memory 40 or on persistent storage 38 so that they may be loaded into a system portion of memory 40 upon a system restart or as needed. The OS, modules 42, 46, and various other applications and drivers, when stored in non-transitory form either in the volatile portion of memory 40, or on persistent storage 38 or in persistent portion of memory 40, each form a computer program product. The processing circuitry 36 running one or more applications thus forms a specialized circuit constructed and arranged to carry out the various processes described herein.

Figure 2:
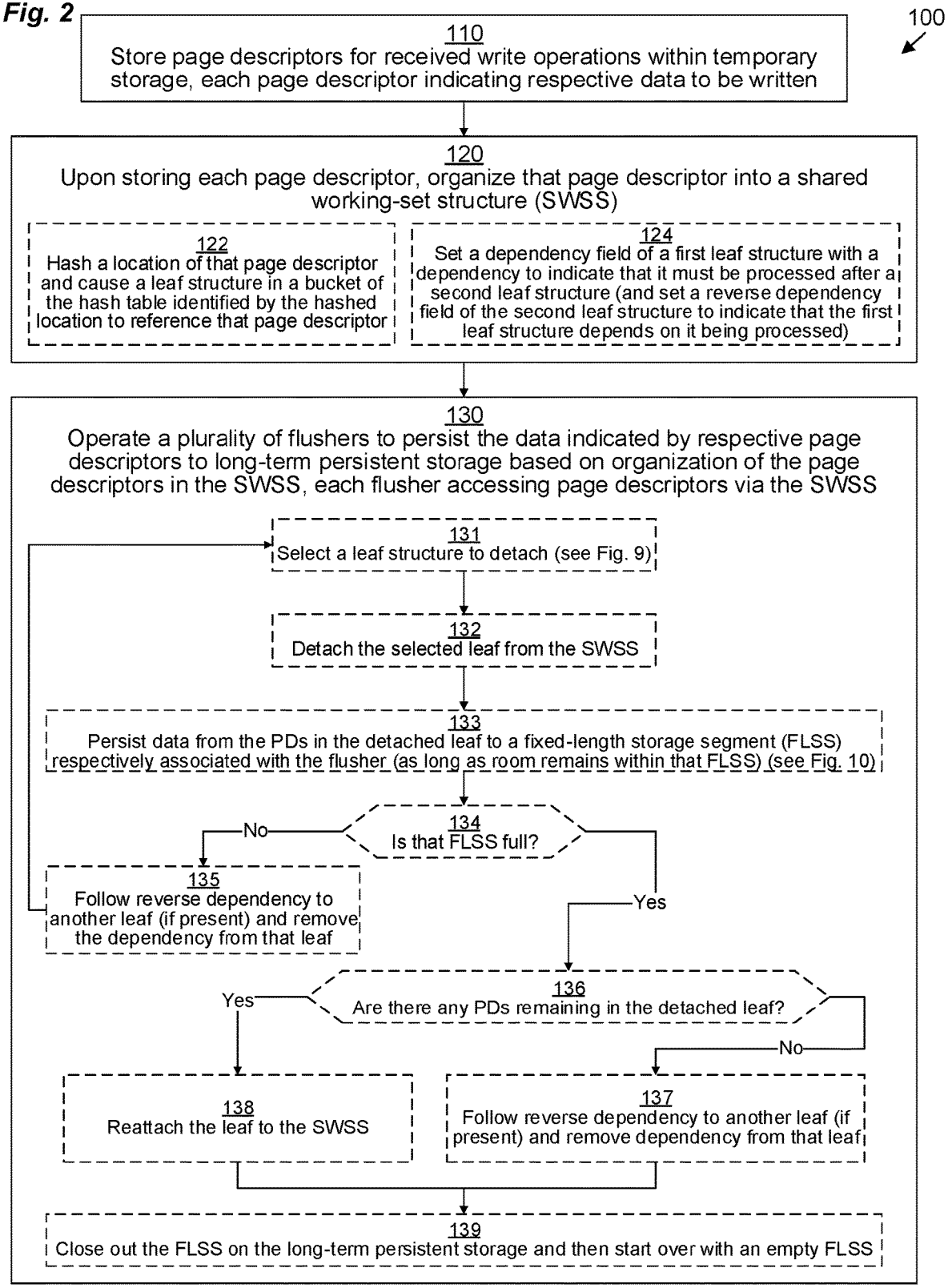
FIG. 2 is a flowchart depicting an example procedure according to various embodiments.

FIG. 2 illustrates an example method 100 performed by computing device 32. It should be understood that any time a piece of software (e.g., OS, modules 42, 46, etc.) is described as performing a method, process, step, or function, what is meant is that a computing device (e.g., computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, intake module 42 stores PDs 51 for received write operations 60 within temporary storage 44, each PD 51 indicating respective data (e.g., a PB 49) to be written (e.g., to a particular logical address managed by the computing device 32 operating as a data storage appliance).

In step 110, upon storing each PD 51, intake module 42 organizes that PD 51 into SWSS 52. For example, intake module 42 causes that PD 51 to be referenced by a particular leaf structure 54, possibly also modifying the organization of the leaf structures 54 within SWSS 52. In some embodiments, step 120 may also include one or more of sub-steps 122, 124.

Figure 3A:
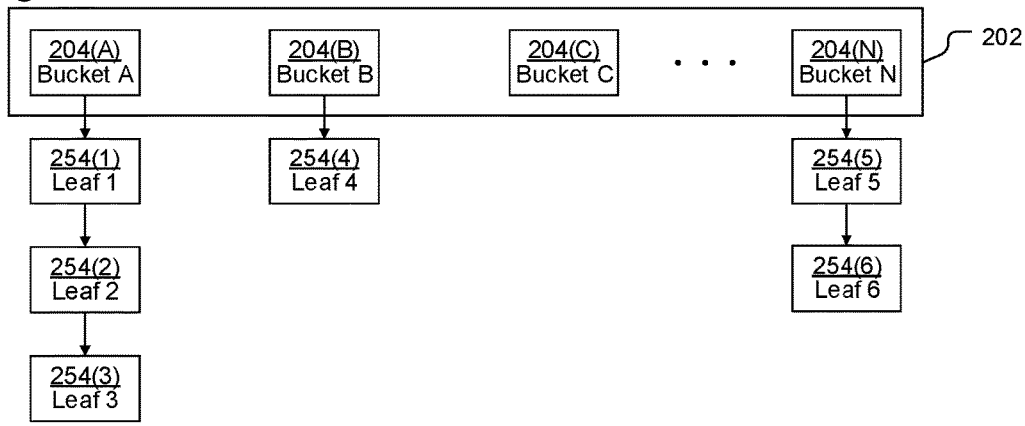
FIGS. 3A-3C are block diagrams depicting various example data structure arrangements for use in connection with various embodiments.

Sub-step 122 may best be illustrated with reference to FIG. 3A. FIG. 3A illustrates an example arrangement 200 of SWSS 52, including a leaf hash table 202. Leaf hash table 202 includes a set of buckets 204 (depicted as buckets 202(A), 202(B), 202(C), . . . 202(N)). One or more buckets 204 points to a chain of leaf structures 254. As depicted, bucket 204(A) points to leaf structures 254(1), 254(2), 254(3), bucket 204(B) points to leaf structure 254(4), and bucket 204(N) points to leaf structures 254(5), 254(6), while bucket 204(C) is empty. In sub-step 122, intake module 42 hashes a location of a PD 51 and causes a leaf structure 254 in a bucket 204 (of the leaf hash table 202) identified by the hashed location to reference that PD 51. Thus, for example, if a PD 51 is addressed to a particular address (e.g., address 743) that falls within a particular address range (e.g., an address range of 512-1023) that happens to be associated with leaf 3 254(3), then by hashing an identifier of that address range (e.g., 512, as the first block of the address range), bucket A 204(A) is identified. Leaf structures 254(1), 254(2), 254(3) all have different address ranges that all happen to hash to bucket A, but by navigating the chain, the proper leaf structure 254(3) can be identified.

Figure 4:
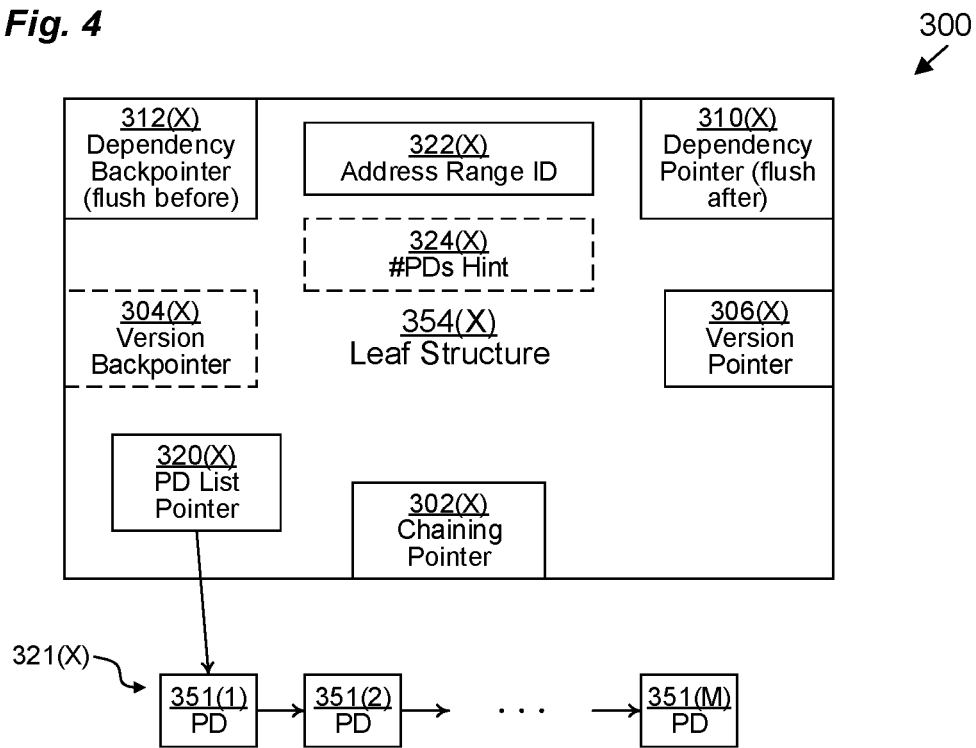
FIG. 4 is a block diagram depicting an example data structure arrangement for use in connection with various embodiments.

Sub-step 124 may best be illustrated with reference to FIG. 4. FIG. 4 illustrates an example arrangement 300 of a leaf structure 354(X). Leaf structure 354(X) includes a chaining pointer 302(X) that points to a next element in a bucket chain. For example, with reference to FIG. 3A, leaf structure 254(1) has a chaining pointer 302 that points to leaf structure 254(2), and leaf structure 254(2) has a chaining pointer 302 that points to leaf structure 254(3), while leaf structure 254(3) has a NULL chaining pointer 302 to indicate the end of the chain.

Returning to FIG. 4, leaf structure 354(X) also includes a PD list pointer 320(X) that points to a first PD 351(1) in a linked list 321(X) of PDs 351 that are referenced by the leaf structure. As depicted, linked list 321(X) includes MPDs 351 (depicted as PDs 351(1), 351(2), . . . , 351(M)). The PDs 351 in the linked list 321(X) are all directed to operations aimed at a particular address range identified by an address range identifier 322(X) also stored within the leaf structure 354(X). Typically the PDs 351 are added to the linked list 321(X) as they are received, so they are normally in sequence, although it is possible for the PDs 351 to be slightly out of order. In some embodiments, the number M of PDs 351 in the list 321(X) may also be stored as a Number of PDs hint 324(X) within the leaf structure 354(X).

Figure 3B:
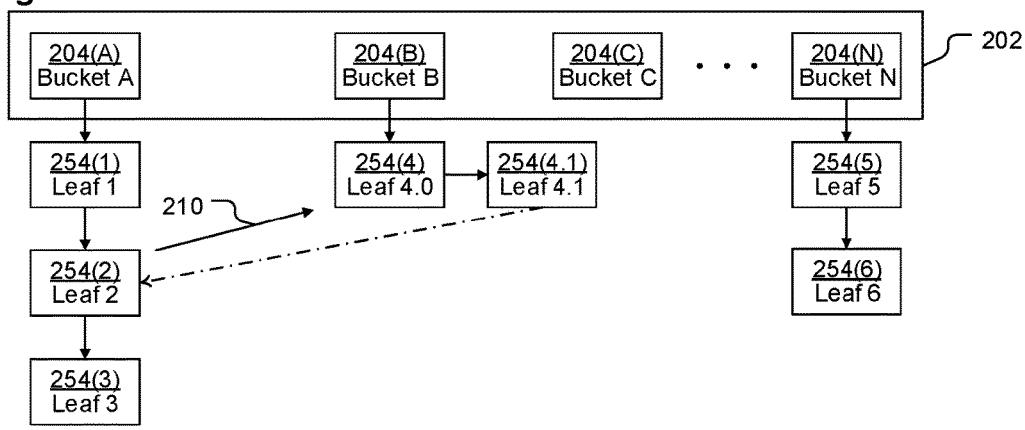

The remaining elements of FIG. 4 may best be illustrated with reference to FIG. 3B. FIG. 3B represents another arrangement 200' similar to arrangement 200 of FIG. 3A but just after a copy command 210 has been ingested indicating that one or more blocks within the address range of leaf structure 2 254(2) should be copied to an address or addresses within leaf structure 4 254(4). At this point, leaf structure 4 is split into original leaf structure 4.0 254(4) and new leaf structure 4.1 254(4.1). New leaf structure 4.1 254(4.1) is used for all new write commands beginning with the copy operation 210, while original leaf structure 4.0 254(4) continues to include PDs 51 for operations that preceded the copy operation. Since the state of new leaf structure 4.1 254(4.1) is dependent on the state of leaf structure 2 254(2), new leaf structure 4.1 254(4.1) is dependent on (indicated by the dash-dot arrow) leaf structure 2 254(2). Returning to FIG. 4, version pointer 306(X) is used to chain together a list of versions of the same leaf structure 54 with different dependency states, while dependency pointer 310(X) and dependency backpointer 312(X) are used to indicate dependency. Thus, in FIG. 3B, original leaf structure 4.0 254(4) would have a version pointer 306 that points to new leaf structure 4.1 254(4.1), while new leaf structure 4.1 254(4.1) would have a NULL version pointer 306. In some embodiments, new leaf structure 4.1 254(4.1) may also contain a version backpointer 304 that points back to original leaf structure 4.0 254(4). In addition, new leaf structure 4.1 254(4.1) would have a dependency pointer 310 that points to leaf structure 2 254(2) to indicate that new leaf structure 4.1 254(4.1) should be flushed after leaf structure 2 254(2), and leaf structure 2 254(2) would have a dependency backpointer 312 that points to new leaf structure 4.1

254(4.1) to indicate that leaf structure 2 254(2) should be flushed before new leaf structure 4.1 254(4.1).

Returning to FIG. 2, in sub-step 124, intake module 42 sets a dependency field 310 of a first leaf structure 54 (e.g., new leaf structure 4.1 254(4.1)) with a dependency (e.g., due to a copy operation 210) to indicate that it must be processed after a second leaf structure 54 (e.g., leaf structure 2 254(2)). Intake module 42 also sets a reverse dependency field 312 of the second leaf structure 54 (e.g., leaf structure 2 254(2)) to indicate that the first leaf structure 54 (e.g., new leaf structure 4.1 254(4.1)) depends on it being processed first.

Figure 3C:
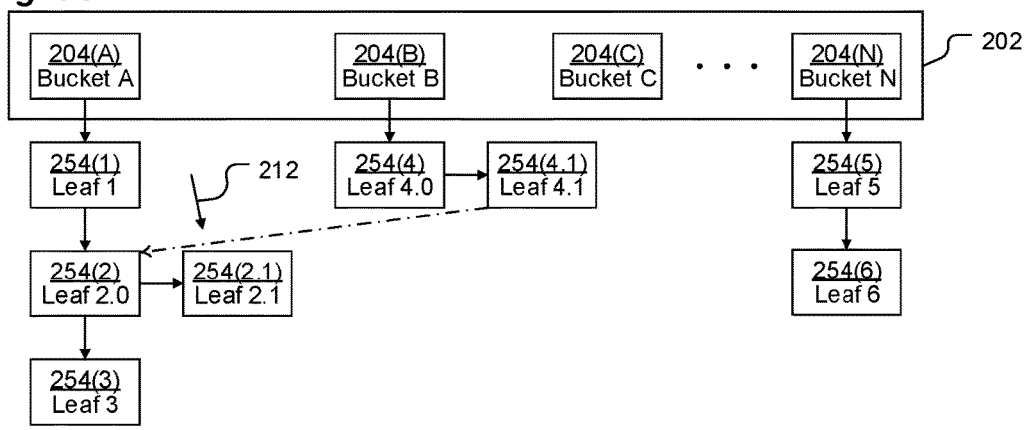

FIG. 3C represents another arrangement 200" similar to arrangement 200' of FIG. 3B but just after a write command 212 has been ingested aimed at one or more blocks within the address range of leaf structure 2 254(2). At this point, leaf structure 2 is split into original leaf structure 2.0 254(2) and new leaf structure 2.1 254(2.1). New leaf structure 2.1 254(2.1) is used for all new write commands 212 subsequent to the copy operation 210, while original leaf structure 2.0 254(2) continues to include PDs 51 for operations that preceded the copy operation 210. In some embodiments (not depicted), instead of waiting for the first write command 212 after the copy operation 210, the split of leaf structure 2 may happen right after the copy operation 210 is ingested.

Figure 5:
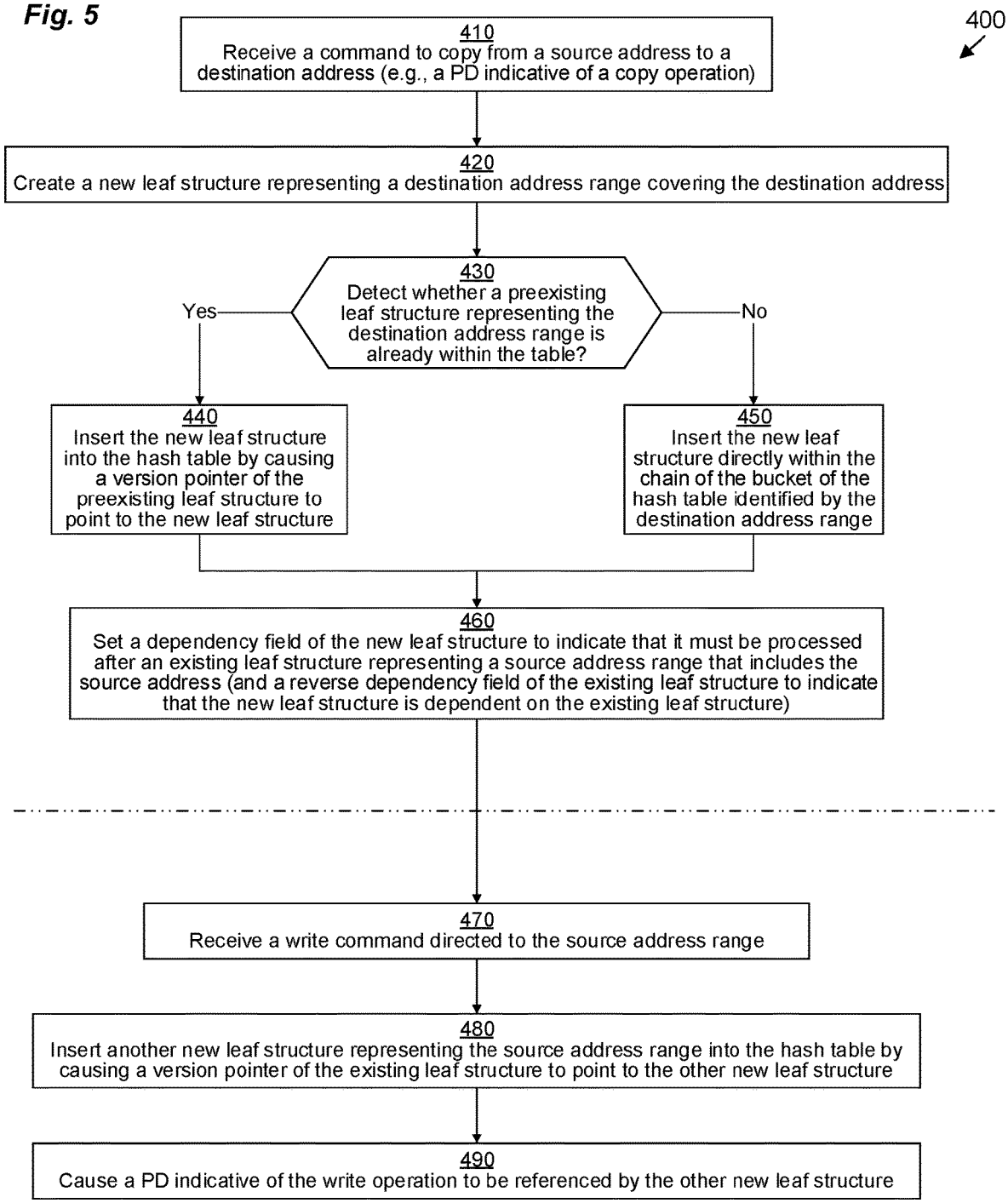
FIG. 5 is a flowchart depicting an example procedure according to various embodiments.

FIG. 5 illustrates an example method 400, performed by intake module 42, that describes what happened in FIG. 3B (steps 410-460) and 3C (steps 470-490). It should be noted that what is described in FIG. 3B is when decision step 430 yields an affirmative result, resulting in performance of step 440. In the event that decision step 430 yields a negative result (i.e., the address range of the destination of the copy command 210 is not yet represented by any leaf structure 254 in the leaf hash table 202), step 450 is performed instead, in which a new leaf structure 254 is added directly into the chain of the appropriate bucket 204.

Figure 6A:
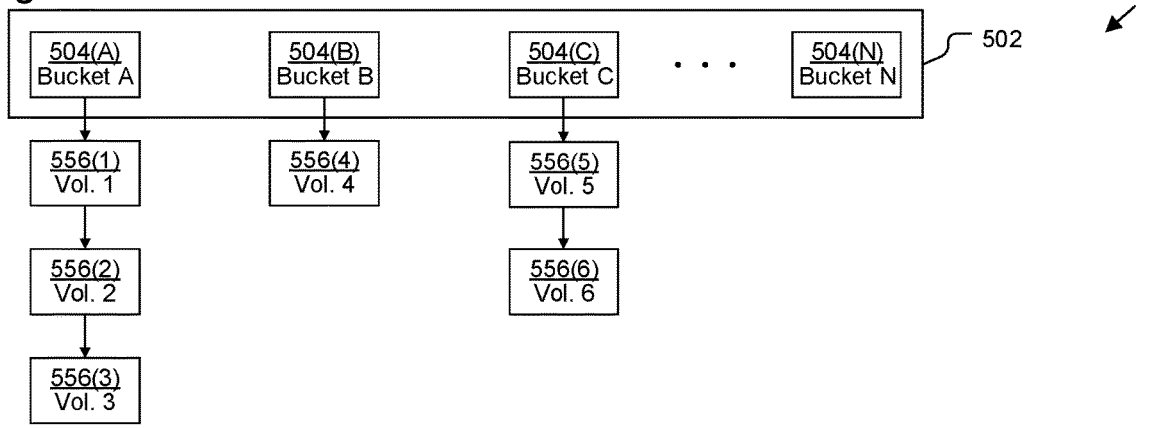
FIGS. 6A-6C are block diagrams depicting various example data structure arrangements for use in connection with various embodiments.

It should be noted that, in some embodiments, SWSS 52 may also include a volume hash table 502 as depicted in arrangement 500 of FIG. 6A. Volume hash table 502 includes a set of buckets 504 (depicted as buckets 502(A), 502(B), 502(C), . . . 502(N)). One or more buckets 504 points to a chain of volume structures 556. As depicted, bucket 504(A) points to volume structures 556(1), 556(2), 556(3), bucket 504(B) points to volume structure 556(4), and bucket 504(C) points to volume structures 556(5), 556(6), while bucket 504(N) is empty. Each volume structure 556 represents a volume or logical disk. In some embodiments, each volume structure 556 has its own dedicated leaf hash table 202, while in other embodiments, all the volume structures 556 share a global leaf hash table 202.

Figure 7:
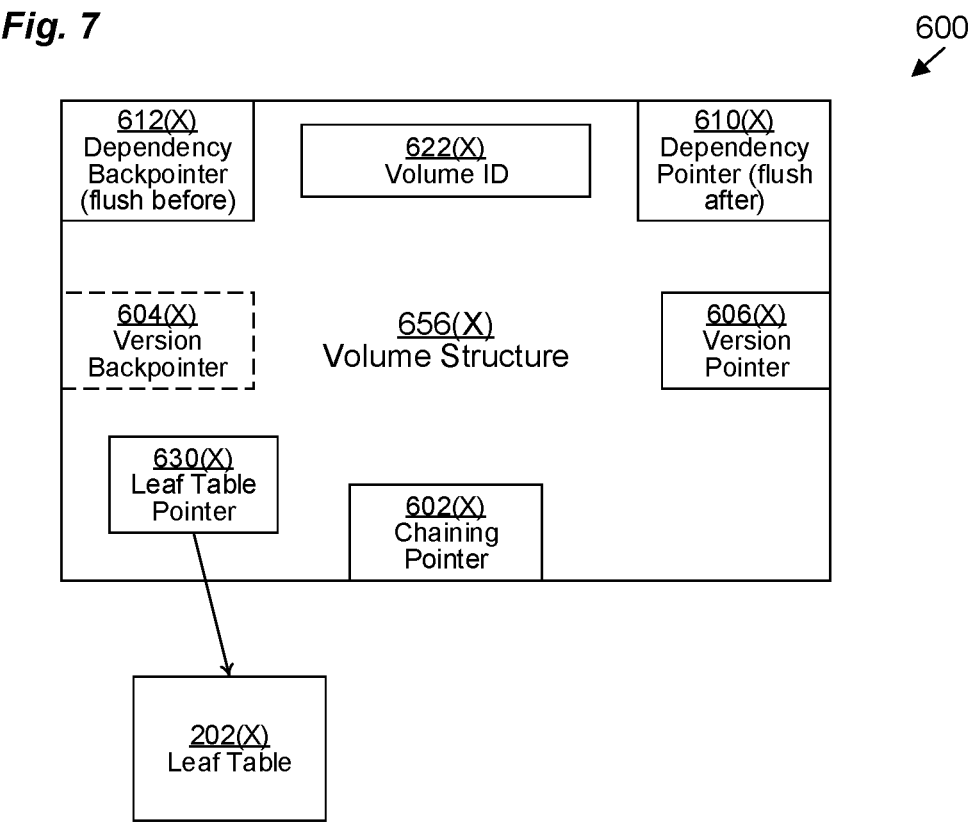
FIG. 7 is a block diagram depicting an example data structure arrangement for use in connection with various embodiments.

FIG. 7 illustrates an example arrangement 600 of a volume structure 656(X). Volume structure 656(X) includes a chaining pointer 602(X) that points to a next element in a bucket chain. For example, with reference to FIG. 6A, volume structure 556(1) has a chaining pointer 602 that points to volume structure 556(2), and volume structure 556(2) has a chaining pointer 602 that points to volume structure 556(3), while volume structure 556(3) has a NULL chaining pointer 602 to indicate the end of the chain.

Returning to FIG. 7, volume structure 656(X) also includes a volume identifier 622(X). Volume structure 656(X) also includes a leaf table pointer 630(X) that points to leaf hash table 202(X) that represents the volume of volume structure 656(X). In some embodiments (not depicted), instead of pointing to a leaf hash table 202(X), pointer 630(X) points to a first leaf structure 254 in a linked list of leaf structures 254 within a global leaf hash table 202, the linked list including all leaf structures 254 that belong to the particular volume of volume structure 656(X).

Figure 6B:
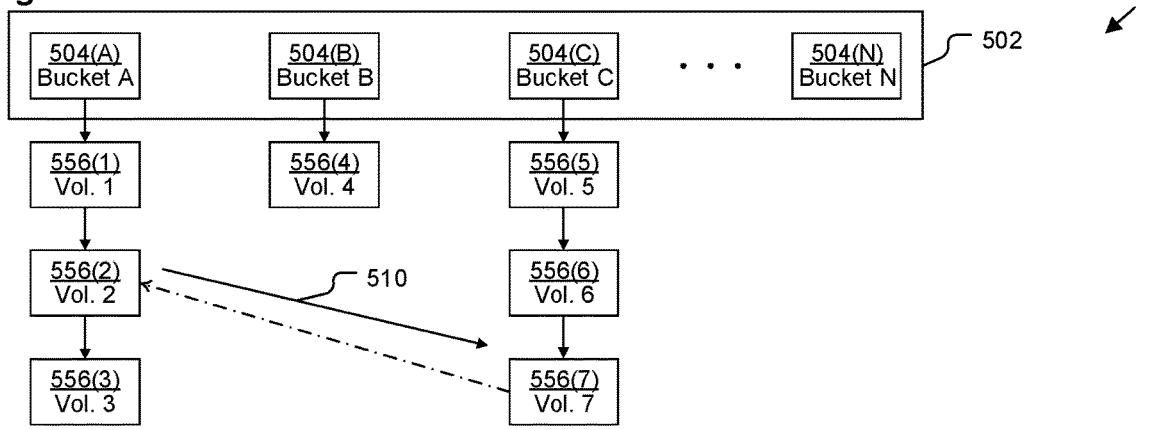
Figure 8:
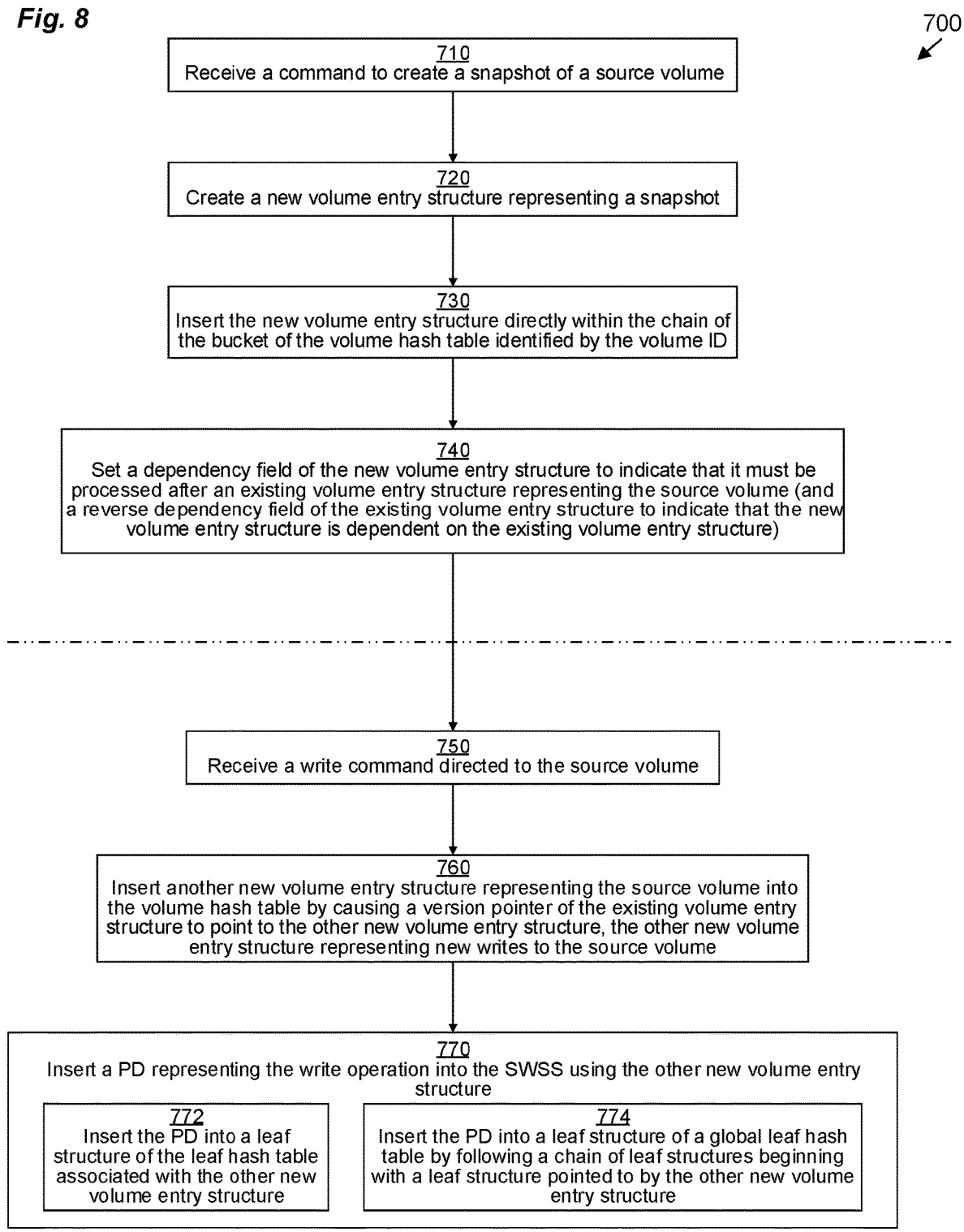
FIG. 8 is a flowchart depicting an example procedure according to various embodiments.

The remaining elements of FIG. 7 may best be illustrated with reference to FIGS. 6B, 6C, and 8. FIG. 6B represents another arrangement 500' similar to arrangement 500 of FIG. 6A but just after a snapshot command 510 has been ingested indicating that volume 2 (represented by volume structure 556(2)) should be snapshotted to create a point-in-time copy, volume 7 (step 710 of method 700 of FIG. 8). Thus, a new volume entry 556(7) is created to represent the new snapshot volume, volume 7 (step 720) and it is inserted into the volume hash table 502 (step 730). Since the state of the snapshot, volume 7, is dependent on the state of original volume 2, new volume structure 556(7) is set to be dependent on (indicated by the dash-dot arrow) volume structure 556(2). This may be done by intake module 42 (step 740) setting a dependency field 610 of new volume structure 556(7) with a dependency (e.g., due to a snapshot operation 510) to indicate that it must be processed after original volume structure 556(2). Intake module 42 also sets a reverse dependency field 612 of the original volume structure 556(2) to indicate that the new volume structure 556(7) depends on it being processed first.

Figure 6C:
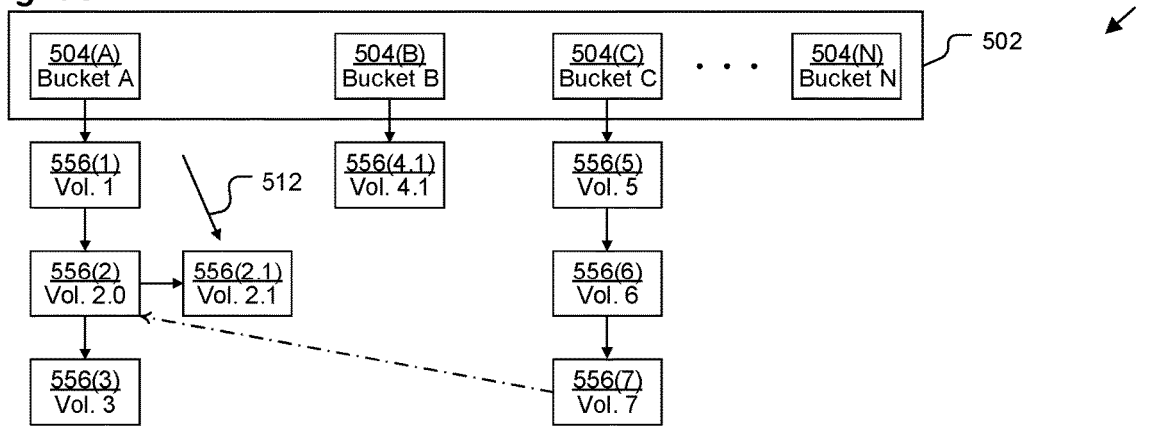

FIG. 6C represents another arrangement 500" similar to arrangement 500' of FIG. 6B but just after a write command 512 has been ingested aimed at one or more blocks within volume 2 (step 750). At this point, volume structure 556(2) is split into original volume structure 2.0 556(2) and new volume structure 2.1 556(2.1) (step 760). New volume structure 2.1 254(2.1) is used for all new write commands 512 subsequent to the snapshot operation 510 (step 770), while original volume structure 2.0 556(2) continues to include PDs 51 for operations that preceded the snapshot operation 510. In some embodiments (not depicted), instead of waiting for the first write command 512 after the snapshot operation 510, the split of volume structure 556(2) may happen right after the snapshot operation 510 is ingested.

Returning to FIG. 7, version pointer 606(X) is used to chain together a list of versions of the same volume structure 556 with different dependency states, while dependency pointer 610(X) and dependency backpointer 612(X) are used to indicate dependency. Thus, in FIG. 6C, original volume structure 556(2) would have a version pointer 606 that points to new volume structure 556(2.1), while new volume structure 556(2.1) would have a NULL version pointer 606. In some embodiments, new volume structure 556(2.1) may also contain a version backpointer 604 that points back to original volume structure 556(2).

Returning to FIG. 2, in step 130, computing device 32 operates a plurality of flushers 46 to persist the data (e.g., in PBs 49) indicated by respective PDs 51 to long-term persistent storage 38 based on organization of the PDs 51 in the SWSS 52, each flusher 46 accessing PDs 51 via the SWSS 52. In some embodiments, the various flushers 46 may each be a separate process, while in other embodiments, the flushers 46 may be lightweight threads that are scheduled to run on a separate container process on each core 35. There may be many flushers 46 running concurrently, possibly more than the number of cores 35.

In some embodiments, step 130 may include sub-steps 131-139, performed by each flusher 46.

Figure 9:
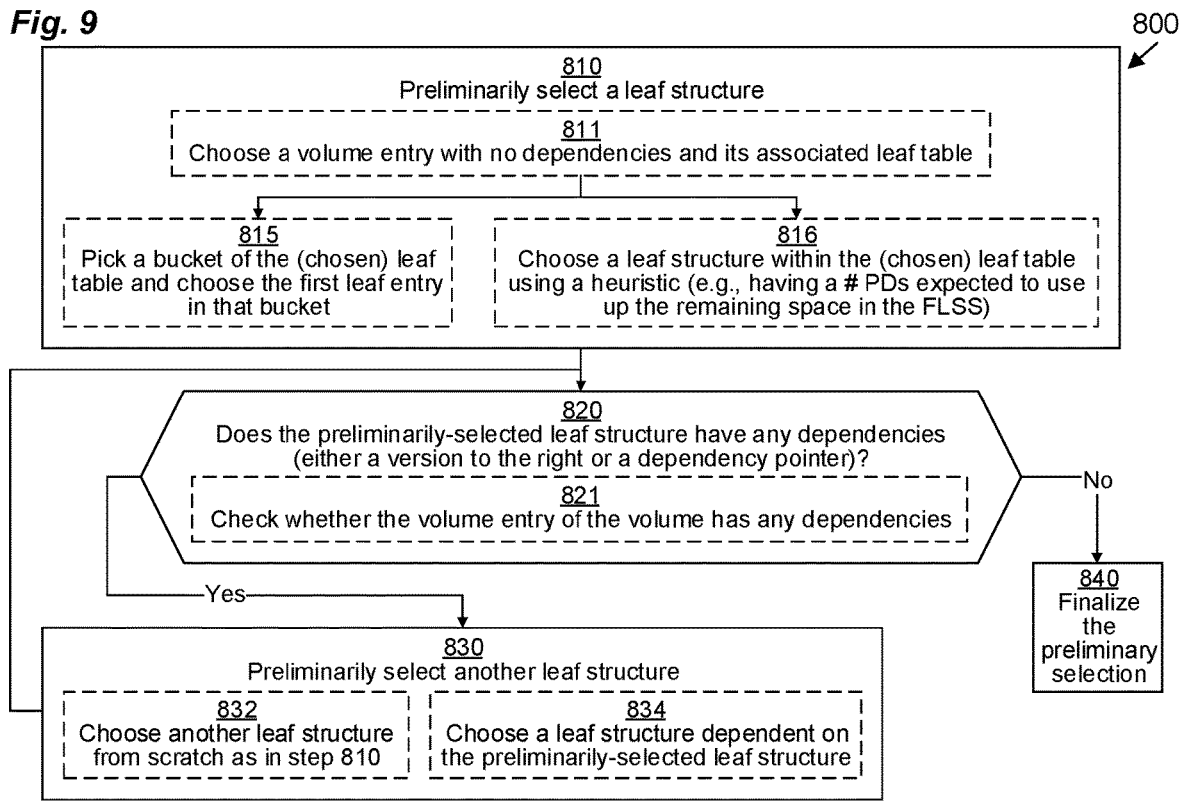
FIG. 9 is a flowchart depicting an example procedure according to various embodiments.

In sub-step 131, a flusher 46 selects a leaf structure 54 to detach from the SWSS 52. In some embodiments, sub-step 131 may be performed by selection method 800 of FIG. 9.

In step 810 of selection method 800, a flusher 46 preliminarily selects a leaf structure 254(Y). In some embodiments, step 810 first involves performing sub-step 811. Thus, initially, flusher 46 chooses a particular leaf hash table 202 by choosing a volume structure 556, 656 that does not have any dependencies. Thus, it should choose a volume structure 556 that is directly within a bucket chain (see FIGS. 6A-6C) rather than a volume structure 556 that is pointed to by a version pointer 606 from another volume structure 556. In addition, the chosen volume structure 556 should not have a set dependency pointer 610. The chosen leaf hash table 202 is indicated by the leaf table pointer 630 of the chosen volume structure 556.

In some embodiments, step 810 also includes sub-step 815. In sub-step 815, flusher 46 picks a bucket 204 of the leaf hash table 202 (selected in sub-step 811) and chooses a leaf structure 254(Y) within the chain of that bucket 204 (e.g., initially the topmost leaf structure 254 in the bucket 204). In some embodiments, flusher 46 may choose the bucket 204 randomly, while in other embodiments, flusher 46 may iterate through the buckets 204 in order. In yet other embodiments (sub-step 816), flusher 46 may use a heuristic to intelligently choose a bucket 204 or leaf structure 254(Y). One example of a heuristic would choose a leaf structure 254(Y) whose #PDs hint 324(Y) indicates a number of PDs 351 that would be expected to fill out the remainder of the FLSS 44 assigned to that flusher 46, based on the size of a standard PB 49 and an expected data reduction ratio (i.e., the total factor by which data size is reduced taking into account both compression and deduplication). Thus, for example, if a PB 49 is 4 kilobytes (KB), the expected data reduction ratio is 4.4, and the FLSS 44 assigned to that flusher 46 has 50 KB of remaining space, then that flusher 46 would attempt to choose a leaf structure 254(Y) whose #PDs hint 324 is about 55.

After step 810, in step 820, flusher 46 determines whether the preliminarily-selected leaf structure 254(Y) has any dependencies. For example, this may include verifying that both the version pointer 306(Y) and the dependency pointer 310(Y) of the preliminarily-selected leaf structure 254(Y) are NULL. In some embodiments, flusher 46 also verifies (sub-step 821) that the volume structure 556 of the volume to which the preliminarily-selected leaf structure 254(Y) belongs also has no dependencies (i.e., both the version pointer 606 and the dependency pointer 610 are NULL). If step 820 has a negative result, then flusher 46 finalizes the preliminarily-selected leaf structure 254(Y) as the final selection. Otherwise, in step 830, flusher 46 preliminarily selects another leaf structure 254(Y') and loops back to step 820, repeating as long as necessary. In some embodiments, step 830 is performed by performing sub-step 832, in which another leaf structure 254 is chosen from scratch as in step 810. In other embodiments, step 830 is performed by performing sub-step 832, in which flusher 46 preliminarily selects as the next leaf structure 254(Y') a leaf structure 254 that is dependent on the previous preliminarily-selected leaf structure 254(Y) (e.g., by following the version pointer 306(Y) or the dependency pointer 310(Y) of the preliminarily-selected leaf structure 254(Y)).

Returning to FIG. 2, after sub-step 131, flusher 46 performs sub-step 132. In sub-step 132, flusher 46 detaches the selected leaf structure 254(Y) from the SWSS 52. For example, if leaf structure 254(2) from FIG. 3C is the selected leaf structure 254(Y), then chaining pointer 302(1) for leaf structure 254(1) is changed to point to leaf structure 254 (2.1), and chaining pointer 302(2.1) for leaf structure 254 (2.1) is changed to point to leaf structure 254(3). As another example, if leaf structure 254(2) from FIG. 3A is the selected leaf structure 254(Y), then chaining pointer 302(1) for leaf structure 254(1) is changed to point to leaf structure 254(3).

Figure 10:
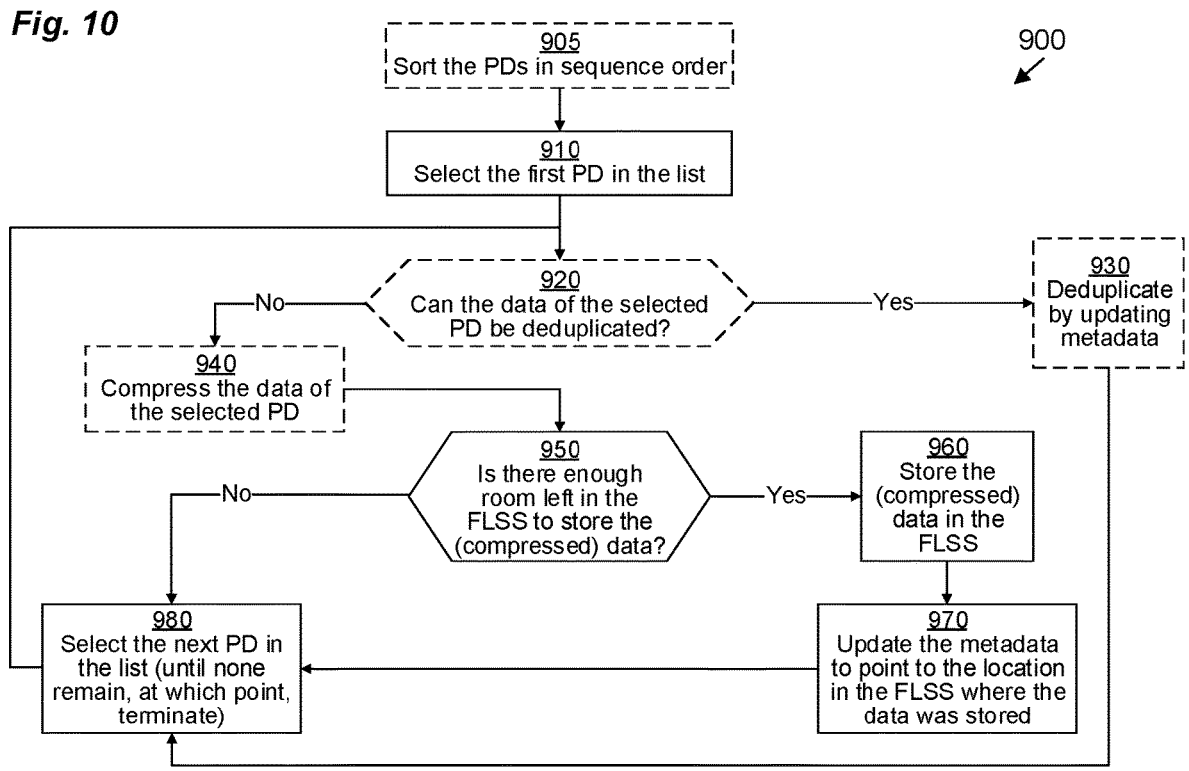
FIG. 10 is a flowchart depicting an example procedure according to various embodiments.

Then, in sub-step 133, flusher 46 persists data from the PDs 351 in the linked list 321(Y) of the (now detached) selected leaf structure 254(Y) to the FLSS 44 respectively associated with the flusher 46, as long as room remains within that FLSS 44. In some embodiments, sub-step 133 may be accomplished by performing method 900 of FIG. 10.

In some embodiments, method 900 begins by sorting the PDs 351 in the linked list 321(Y) in sequence order. Then, in step 910, flusher 46 selects the first PD 351(1) in the linked list 321(Y). Then, in some embodiments, in step 920, flusher 46 determines whether or not the data of the PB 49 of the selected PD 351 can be deduplicated. If so, then, in step 930, flusher 46 deduplicates the PB 49 by updating metadata 56 to reference a previously-stored version of that PB 49 and frees the PD 351 and its PB 49, after which operation proceeds to step 980.

If 920 yields a negative result (or in embodiments in which step 920 is omitted), operation proceeds with step 940, if compression is being used. In step 940, flusher 46 compresses the data of PB 49 and proceeds to step 950.

In step 950, flusher 46 determines whether or not the (compressed) data can fit into the FLSS 44. If so, then, in step 960, flusher 46 stores the (compressed) data in the FLSS 44, and in step 970, flusher 46 updates the metadata 56 to point to the location in the FLSS 44 where the (compressed) data was stored and frees the PD 351 and its PB 49.

Step 980 is performed after steps 930 and 970, as well as after a negative result from step 950 (although in some embodiments, a negative result in step 950 may result in method 900 terminating). In step 980, flusher 46 selects the next PD 351 in the linked list 321(Y). If no PDs 351 remain at the end of the linked list 321(Y), then method 900 terminates. Otherwise, operation returns back to step 920 (or step 940 or 950, if deduplication or both deduplication and compression are not being used).

Returning to FIG. 2, after sub-step 133, operation proceeds with sub-step 134. In sub-step 134, flusher 46 determines whether the FLSS 44 is full. If not (and the selected leaf structure 254(Y) was flushed fully), then operation proceeds with sub-step 135, in which flusher 46 follows the dependency backpointer 312(Y) for the selected leaf structure 254(Y) (unless it is NULL), and removes the dependency from whatever leaf structure 254 depended on the selected leaf structure 254(Y) (i.e., by setting the dependency pointer 310 of that leaf structure 254 to NULL). Then, in sub-step 136, operation returns back to sub-step 131 to select another leaf structure 254 to be detached and flushed.

If sub-step 134 yields an affirmative result, then flusher 46 determines whether there are any PDs 351 remaining in the linked list 321(Y) of the selected leaf structure 254(Y). If so, then, in sub-step 138, flusher 46 reattaches that selected leaf structure 254(Y) back into the location in the SWSS 52 from which it was removed (in step 132) and proceeds to step 139. Otherwise, in sub-step 137, flusher 46 follows the dependency backpointer 312(Y) for the selected leaf structure 254(Y) (unless it is NULL), and removes the dependency from whatever leaf structure 254 depended on the selected leaf structure 254(Y) (i.e., by setting the dependency pointer 310 of that leaf structure 254 to NULL).

Sub-step 139 follows steps 137 and 138. In sub-step 139, flusher 46 closes out the current FLSS 44 on the long-term persistent storage 38 and then starts over again with a new empty FLSS 44.

Thus, techniques have been presented techniques for organizing a cache (e.g., temporary storage 44) without using ring buffers in a manner that also improves dependency analysis and increases the utilization of fixed-length storage segments 44. This may be accomplished by organizing page descriptors 51 of a pool 50 of page descriptors 51 into a shared working-set structure 52 whose organization accounts for dependencies. This allows for many flushers 46 to independently operate in parallel to flush from the working-set structure 52 until each respective flusher's fixed-length storage segment 44 is full. By arranging the shared working-set structure 52 into easily-detachable containers (e.g., leaf structures 54), operation can be further optimized.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of performing write operations that have been received by a data storage apparatus, the method comprising:
   storing a plurality of page descriptors for received write operations within temporary storage, each page descriptor of the plurality of page descriptors indicating respective data to be written;
   upon storing each page descriptor of the plurality of page descriptors, organizing that page descriptor into a shared working-set structure, the shared working-set structure including a set of leaf structures, each leaf structure referencing a respective set of page descriptors, said organizing including causing a leaf structure to reference a set of related page descriptors; and
   operating a plurality of flushers to persist the data indicated by the plurality of page descriptors to long-term persistent storage based on organization of the plurality of page descriptors in the shared working-set structure, each flusher accessing page descriptors of the plurality of page descriptors via the shared working-set structure, said operating the plurality of flushers including operating each of the plurality of flushers to (i) detach a leaf structure from the shared working-set structure and (ii) persist data indicated by the related page descriptors referenced by the detached leaf structure to the long-term persistent storage.

2. The method of claim 1 wherein:
   operating each flusher to persist data further includes persisting data to a respective fixed-length storage segment on the long-term persistent storage for that flusher; and
   operating the plurality of flushers to persist the data further includes operating each flusher to continue detaching leaf structures and persisting data indicated by related page descriptors referenced by those detached leaf structures to that flusher's fixed-length storage segment until that fixed-length storage segment is full.

3. The method of claim 2 wherein operating each flusher to continue detaching leaf structures and persisting data indicated by related page descriptors referenced by those detached leaf structures to that flusher's fixed-length storage segment until that fixed-length storage segment is full includes, for a last leaf structure detached prior to that fixed-length storage segment becoming full, removing references to page descriptors whose data has been persisted from the last leaf structure and reattaching the last leaf structure to the shared working-set structure.

4. The method of claim 2 wherein operating each flusher to continue detaching leaf structures and persisting data of related page descriptors referenced by those detached leaf structures to that flusher's fixed-length storage segment includes selecting a leaf structure to detach based on a number of page descriptors referenced by that leaf structure and an amount of space left in that fixed-length storage segment.

5. The method of claim 1 wherein:
   organizing further includes setting a dependency field of a leaf structure to indicate that it must be processed after another leaf structure; and
   operating the plurality of flushers to persist the data further includes operating each flusher to select, for detaching, a leaf structure with an empty dependency field indicating that it need not be processed after any other leaf structure.

6. The method of claim 5 wherein selecting the leaf structure for detaching includes:
preliminarily choosing a test leaf structure to be detached; and
in response to detecting that the test leaf structure includes a set dependency field indicating that it must be processed after another leaf structure, selecting a different leaf structure in place of the test leaf structure that is neither the test leaf structure nor the other leaf structure.

7. The method of claim 5 wherein selecting the leaf structure for detaching includes:
preliminarily choosing a test leaf structure to be detached; and
in response to detecting that the test leaf structure includes a set dependency field indicating that it must be processed after another leaf structure, selecting the other leaf structure in place of the test leaf structure.

8. The method of claim 5 wherein:
organizing further includes setting a reverse dependency field of a leaf structure to indicate that it must be processed before yet another leaf structure; and
operating the plurality of flushers to persist the data further includes operating each flusher to, for a detached leaf structure that includes a set reverse dependency field indicating that it must be processed before a dependent leaf structure, after persisting data indicated by the related page descriptors referenced by the detached leaf structure, unsetting the dependency field of the dependent leaf structure to indicate that it no longer need be processed after the detached leaf structure.

9. The method of claim 1 wherein:
the shared working-set structure includes a hash table; and
organizing that page descriptor into the shared working-set structure further includes hashing a location of that page descriptor and causing a leaf structure in a bucket of the hash table identified by the hashed location to reference that page descriptor.

10. The method of claim 9 wherein:
hashing a location of that page descriptor includes hashing an identifier of a range of logical block addresses, that page descriptor indicating data to be written to a block within the range; and
the leaf structure identified by the hashed location references page descriptors indicating data to be written to blocks within the range of that location.

11. The method of claim 10 wherein organizing further includes, for a page descriptor indicative of a copy operation from a source block at a first logical block address to a destination block at a second logical block address:
creating a new leaf structure, within the shared working-set structure, representing a destination range of logical block addresses that includes the second logical block address; and
setting a dependency field of the new leaf structure to indicate that it must be processed after an existing leaf structure representing a source range of logical block addresses that includes the first logical block address.

12. The method of claim 11 wherein organizing further includes, for the page descriptor indicative of the copy operation from the source block to the destination block:
hashing an identifier of the destination range, yielding a destination hash;
detecting a preexisting leaf structure representing the destination range within a bucket of the hash table identified by the destination hash, the preexisting leaf structure representing writes made to the destination range prior to the copy operation; and
inserting the new leaf structure into the hash table by causing a version pointer of the preexisting leaf structure to point to the new leaf structure.

13. The method of claim 9 wherein:
the shared working-set structure further includes an outer hash table containing entries that represent storage volumes; and
organizing that page descriptor into the shared working-set structure further includes, prior to hashing the location of that page descriptor, hashing a storage volume with which that page descriptor is associated to locate an entry in the outer hash table that represents the storage volume with which that page descriptor is associated.

14. The method of claim 13 wherein:
each entry of the outer table has a respective associated hash table of a plurality of hash tables; and
organizing that page descriptor into the shared working-set structure further includes, prior to hashing the location of that page descriptor:
selecting the hash table from the plurality of hash tables with reference to the located entry in the outer hash table that represents the storage volume with which that page descriptor is associated and
hashing the location of that page descriptor includes hashing an identifier of a range of logical block addresses within the storage volume with which that page descriptor is associated, that page descriptor indicating data to be written to a block within the range.

15. The method of claim 13 wherein organizing further includes, for a page descriptor indicative of a snapshot creation operation for a main storage volume:
creating a new entry in the outer hash table, the new entry representing a snapshot of the main storage volume; and
setting a dependency field of the new entry to indicate that it must be processed after an existing entry in the outer hash table, the existing entry representing writes made to the main storage volume prior to the snapshot operation.

16. The method of claim 15 wherein organizing further includes, for another page descriptor indicative of a write operation to the main storage volume after the snapshot creation operation:
inserting another new entry in the outer hash table by causing a version pointer of the existing entry to point to the other new entry, the other new entry representing writes made to the main storage volume after the snapshot operation;
causing the other new entry to point to the existing entry; and
performing the write operation to the main storage volume with reference to the other new entry.

17. A computer program product comprising a non-transitory computer-readable storage medium storing instructions, which, when performed by a data storage apparatus, cause the data storage apparatus to perform received write operations by:
storing a plurality of page descriptors for the received write operations within temporary storage, each page descriptor of the plurality of page descriptors indicating respective data to be written;
upon storing each page descriptor of the plurality of page descriptors, organizing that page descriptor into a shared working-set structure, the shared working-set structure including a set of leaf structures, each leaf structure referencing a respective set of page descriptors, said organizing including causing a leaf structure to reference a set of related page descriptors; and operating a plurality of flushers to persist the data indicated by the plurality of page descriptors to long-term persistent storage based on organization of the plurality of page descriptors in the shared working-set structure, each flusher accessing page descriptors of the plurality of page descriptors via the shared working-set structure, said operating the plurality of flushers including operating each of the plurality of flushers to (i) detach a leaf structure from the shared working-set structure and (ii) persist data indicated by the related page descriptors referenced by the detached leaf structure to the long-term persistent storage.

18. A data storage apparatus comprising:

temporary storage;

long-term persistent storage; and processing circuitry coupled to memory configured to perform received write operations by:

storing a plurality of page descriptors for the received write operations within the temporary storage, each page descriptor of the plurality of page descriptors indicating respective data to be written;

upon storing each page descriptor of the plurality of page descriptors, organizing that page descriptor into a shared working-set structure, the shared working-set structure including a set of leaf structures, each leaf structure referencing a respective set of page descriptors, said organizing including causing a leaf structure to reference a set of related page descriptors; and operating a plurality of flushers to persist the data indicated by the plurality of page descriptors to the long-term persistent storage based on organization of the page descriptors in the shared working-set structure, each flusher accessing page descriptors of the plurality of page descriptors via the shared working-set structure, said operating the plurality of flushers including operating each of the plurality of flushers to (i) detach a leaf structure from the shared working-set structure and (ii) persist data indicated by the related page descriptors referenced by the detached leaf structure to the long-term persistent storage.

* * * * *